(12) United States Patent
Reynolds et al.

(10) Patent No.: US 12,518,076 B1
(45) Date of Patent: Jan. 6, 2026

(54) METHOD AND SYSTEM FOR BUG FINDING BY CHECKING LIVENESS PROPERTIES OF CIRCUITS WITH FORMAL VERIFICATION

(71) Applicant: Cadence Design Systems, Inc., San Jose, CA (US)

(72) Inventors: Vince Reynolds, Berkshire (GB); Ranan Fraer, Haifa (IL); Adriana Braz, Brasilia-DF (BR); Habeeb Anton Farah, Nazareth (IL)

(73) Assignee: Cadence Design Systems, Inc., San Jose, CA (US)

( * ) Notice: Subject to any disclaimer, the term of this patent is extended or adjusted under 35 U.S.C. 154(b) by 671 days.

(21) Appl. No.: 17/956,723

(22) Filed: Sep. 29, 2022

(51) Int. Cl.
*G06F 30/3323* (2020.01)

(52) U.S. Cl.
CPC .................. *G06F 30/3323* (2020.01)

(58) Field of Classification Search
None
See application file for complete search history.

(56) References Cited

U.S. PATENT DOCUMENTS

| | | | |
|---|---|---|---|
| 10,394,987 B2* | 8/2019 | Baumgartner | G06F 30/3323 |
| 10,789,403 B1* | 9/2020 | Dureja | G06F 17/16 |
| 11,580,284 B1* | 2/2023 | Deaton | G06F 30/3323 |

OTHER PUBLICATIONS

A. Ivrii et al., "κ-FAIR = κ-LIVENESS FAIR Revisiting SAT-based Liveness Algorithms", IBM Corporation, 5 pages.

* cited by examiner

*Primary Examiner* — Leigh M Garbowski
(74) *Attorney, Agent, or Firm* — Foley & Lardner LLP

(57) ABSTRACT

Systems and methods of debugging a design under test (DUT) using formal verification are disclosed. In one aspect, a method includes receiving the DUT from a user and a command to find a counter-example of a liveness property of the DUT and a verification trace including a sequence of states structures as a stem followed by a loop. The method further includes receiving a length of the loop from the user and executing a verification algorithm based on the length of the loop. The method further includes determining that the counter-example is found when the execution of the verification algorithm ends after traversing the stem and the loop.

20 Claims, 8 Drawing Sheets

```
hunt --config
    --mode
    --strategy
    --max_jobs
    --engine_mode
    --seed
    --loop_length
    --loop_length_incr <N>
                         loop_swarm
                         <max-text-name>
                         <bug hunting engine>
                         <list | distribution>
```

FIG. 5

METHOD AND SYSTEM FOR BUG FINDING BY CHECKING LIVENESS PROPERTIES OF CIRCUITS WITH FORMAL VERIFICATION

TECHNICAL FIELD

The present implementations relate generally to verification systems, and more particularly to checking liveness properties of circuits using formal verification.

BACKGROUND

Modern semiconductor based integrated circuits (ICs) are increasingly complex and contain millions of circuit devices, such as transistors, and millions of interconnections between the circuit devices. Designing such complex circuits cannot be accomplished manually, and circuit designers use computer based Electronic Design Automation (EDA) tools for synthesis, debugging, and functional verification of the ICs.

A popular method of verifying the functionality of a circuit is using formal verification. In formal verification, mathematical equations are used to prove or disprove a property. A safety property asserts that something bad never happens, and a counter-example of a safety property shows that something bad does happen. A liveness property asserts that something good eventually happens, and a counter-example is when the trace enters an infinite loop of only bad states. It is often difficult to prove a liveness property. In every cycle of the trace, the formal verification tool needs to explore two scenarios: a loop is found leading to a counter-example, or the system advances to the next cycle without violating the property.

SUMMARY

What is therefore desired is a system and method for improvements in checking liveness properties of circuits using formal verification. Embodiments of the present disclosure include the use of setting a loop length in order to efficiently find bugs. When the counter-example is found, the user knows that a bug exists in the design specification and can proceed to fix it.

One aspect of the disclosure includes a method for debugging a design under test (DUT) using formal verification. The method includes receiving, by one or more processors, the DUT and a liveness property from a user, receiving, by the one or more processors, a command to find a counter-example of the liveness property of the DUT and a verification trace including a sequence of states structures as a stem followed by a loop. The method further includes receiving, by the one or more processors, a length of the loop from the user, executing, by the one or more processors, a verification algorithm based on the length of the loop, and determining, by the one or more processors, that the counter-example is found when the execution of the verification algorithm ends after traversing the stem and the loop.

The method can further include receiving, by the one or more processors, a time limit of how long to execute the verification algorithm, and the execution of the verification algorithm is configured to take at most the time limit.

The method can further include receiving, by the one or more processors, a range of the loop lengths, wherein the execution of the verification algorithm is simultaneously performed for each length from a minimum of the range to a maximum of the range.

The execution of the verification algorithm can be performed for every loop length within the range.

The method can further include partitioning, by the one or more processors, the range into intervals specified by an interval length.

The method can further include receiving, by the one or more processors, an input to select random loop lengths within the range.

The execution of the verification algorithm can be performed for a plurality of lengths of the loop using a plurality of threads. Each thread of the plurality of threads can be configured to perform the execution of the verification algorithm of one of the plurality of lengths. The method can further include stopping, by the one or more processors, the execution of the verification algorithm for all of the plurality of lengths when the counter-example is found in any of the plurality of lengths.

The method can further include displaying, by the one or more processors, results of the plurality of threads executing the verification algorithm in a plurality of tabs.

Another aspect is a system for debugging a DUT using formal verification, the system including one or more processors having instructions stored thereon that, when executed by the one or more processors, causes the one or more processors to: receive the DUT and a liveness property from a user, receive a command to find a counter-example of the liveness property of the DUT and a verification trace including a sequence of states structures as a stem followed by a loop. The instructions can further cause the one or more processors to receive a length of the loop from the user, execute a verification algorithm based on the length of the loop, and determine that the counter-example is found when the execution of the verification algorithm ends after traversing the stem and the loop.

The instructions can further cause the one or more processors to receive a range of the loop lengths, wherein the execution of the verification algorithm is simultaneously performed for each length from a minimum of the range to a maximum of the range.

The execution of the verification algorithm can be performed for every loop length within the range.

The instructions can further cause the one or more processors to partition the range into intervals specified by an interval length.

The instructions can further cause the one or more processors to receive an input to select random loop lengths within the range.

The execution of the verification algorithm can be performed for a plurality of lengths of the loop using a plurality of threads, and each thread of the plurality of threads can be configured to perform the execution of the verification algorithm of one of the plurality of lengths. The instructions can further cause the one or more processors to stop the execution of the verification algorithm for all of the plurality of lengths when the counter-example is found in any of the plurality of lengths.

The instructions can further cause the one or more processors to display results of the plurality of threads executing the verification algorithm in a plurality of tabs.

Another aspect is a non-transitory computer readable medium including one or more instructions stored thereon and executable by one or more processors to: receive the DUT from a user, receive a command to find a counter-example of a liveness property of the DUT and a verification trace including a sequence of states structures as a stem followed by a loop. The instructions can further cause the one or more processors to receive a length of the loop from the user, execute a verification algorithm based on the length of the loop, and determine that the counter-example is found when the execution of the verification algorithm ends after traversing the stem and the loop.

The instructions can further cause the one or more processors to receive a range of the loop lengths, wherein the execution of the verification algorithm is simultaneously performed for each length from a minimum of the range to a maximum of the range.

The execution of the verification algorithm can be performed for every loop length within the range.

The instructions can further cause the one or more processors to partition the range into intervals specified by an interval length.

The instructions can further cause the one or more processors to receive an input to select random loop lengths within the range.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 5 illustrates an example command line input for executing the loop length swarm strategy, in accordance with some embodiments.

DETAILED DESCRIPTION

Figure 1:
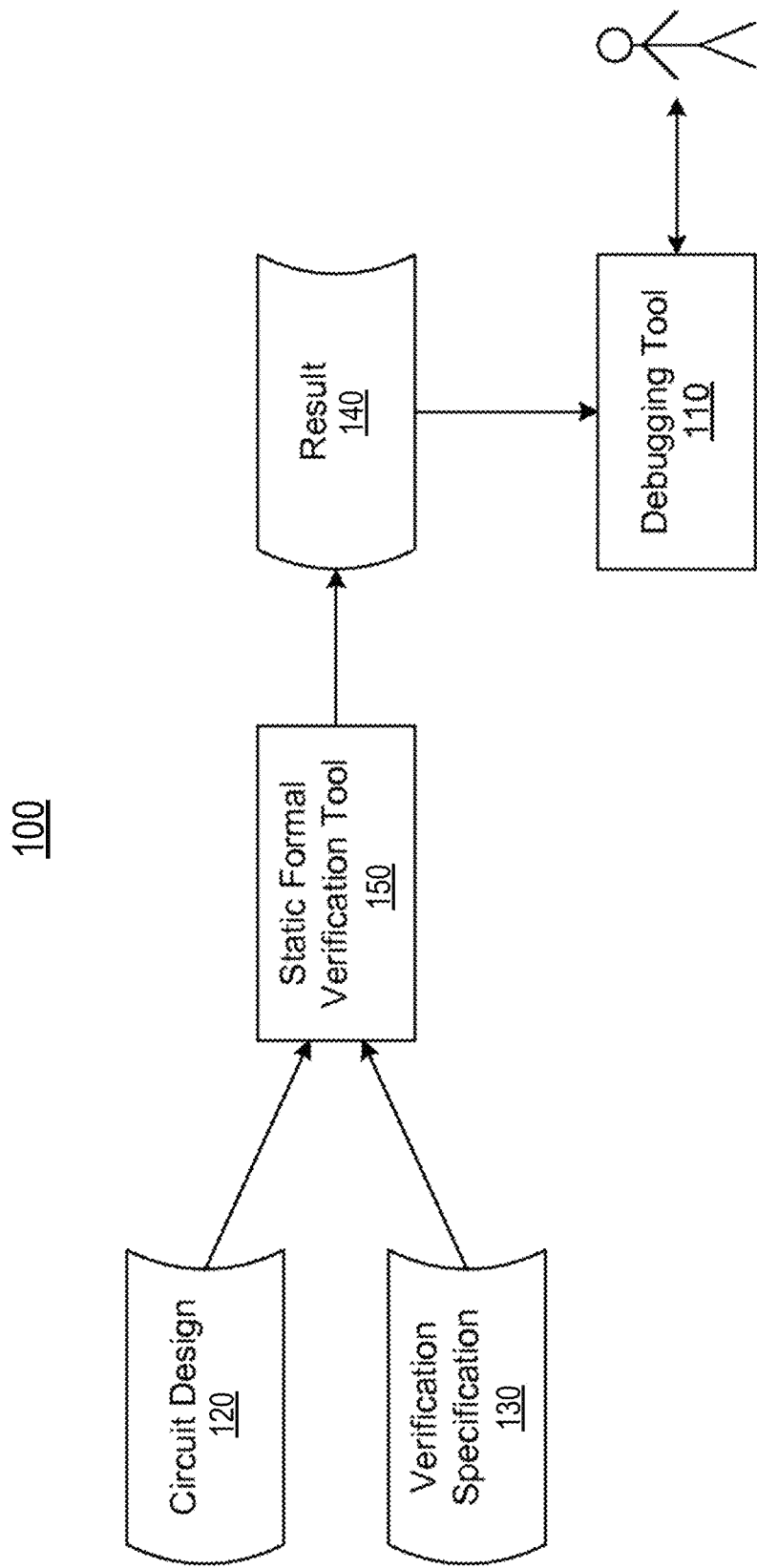
FIG. 1 illustrates a process for formal verification of a circuit design, in accordance with some embodiments.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Formal verification has risen in popularity to debug systems. Formal verification typically uses mathematical programs, algorithms, or models (referred to herein as a verification algorithm) to prove or disprove correctness of the intended design by using assertions. Assertions are statements or expressions that, if false, indicates an error or bug. In hardware design, an assertion is a conditional statement that checks for specific behavior and displays a message if it occurs. When the conditional statement is not satisfied, the scenario or situation in which the scenario occurs is called a counter-example.

Within formal verification, there are two types of properties. Safety properties assert that something bad never happens, and liveness properties assert that something good eventually happens. Verification of liveness properties can be quite complex. Furthermore, verifying liveness properties can take a long time and use up a lot of compute resources because finding a counter-example can take a long time. To overcome this complexity, users often invest manual effort like applying abstractions or adding environment restrictions. Verifying the liveness property can be tedious and inefficient and prone to error. Accordingly, there is a need to more efficiently verify liveness properties with a high degree of accuracy.

Embodiments of the present disclosure provide methods and systems of verifying the liveness property of a DUT using formal verification. A user may provide a number of states in a loop, and the formal verification tool can form a loop of the verification trace having that loop. If the verification tool enters the loop and does not exit, a counter-example is found. If the verification tool completes its run before entering the loop, a bug was not found within the loop lengths that were checked. Embodiments also include verification threading that can include each thread running a verification algorithm for a different loop length so that the counter-example can be found easier and quicker. Accordingly, the found counter-example within a limited number of loop lengths can be used to find bugs within the design.

FIG. 1 illustrates a process 100 for formal verification of a circuit design 120, in accordance with some embodiments. The process 100 may be performed by a debugging server which may include a static formal verification tool 150 and a debugging tool 110. A circuit design 120 may be embodied in a data file encoded using a hardware description language (HDL), which may describe the structural design and operation of a circuit. A set of requirements may be derived from a design specification for the circuit and then used to test whether the circuit design is compliant with the design specification. A user, such as a circuit designer or a verification engineer, may supply the requirements for the circuit design. The requirements may be encoded in a verification specification 130 as one or more properties and/or assumptions for the circuit design 120, encoded for example using Property Specification Language (PSL) or System Verilog Assertion (SVA). The verification specification 130 may be directly coded by a user or captured in an automated process. A property may be represented in the verification specification 130 as an assertion, where the assertion is satisfied if the property is true for all operating conditions of the circuit design 120. A property may also be represented in the verification specification 130 as a cover, where the cover is satisfied if the property is true for some operating condition of the circuit design 120. An assumption specifies that certain input signals to the circuit design may only take on pre-determined values (e.g., "0" or "1") at certain clock cycles when testing the circuit design against the property.

In a formal verification process, the verification tool 150 receives a circuit design 120 and a verification specification 130 for testing the circuit design 120 against a set of requirements. The circuit design 120 and verification specification 130 may be represented in one or more files containing HDL code, which define a digital design and/or properties that give a functional specification of the design. The verification tool 150 may convert the inputs (e.g., the circuit design 120 and verification specification 130) into an internal representation using one or more data structures, such as a netlist. This conversion may comprise two different conversions: (1) synthesis of the input circuit design 120, and (2) property compilation of the properties in the verification specification 130.

The results of the design synthesis and the property compilation are then combined into a common problem instance that is given as input to a model checker in the verification tool 150. The verification tool 150 then performs formal verification on the circuit design 120 using the statically allocated data structure. For assertions, during the formal verification process, the model checker attempts to determine whether there is a possible behavior of the circuit design 120 where one of the properties in the verification specification 130 are not true, which is called a counter-example for the property. If it is determined that no counter-example exists for a property, the property is said to be proven. The results 140 of the formal verification process may thus comprise an indication of whether one or more of the properties are satisfied, and if not, the counter-example showing a condition under which the property fails. The counter-example may include a sequence of values for signals (input, internal, or output) of the circuit design over a number of clock cycles that satisfy the given assumptions but result in the property failure.

The verification of a cover may proceed in a similar way. In some embodiments, for a cover, the verification tool 150 attempts to determine whether there is a possible behavior of the circuit design that satisfies the cover, which is called a cover trace. This cover trace includes a sequence of values for signals of the circuit design over a number of clock cycles that satisfy the given assumption and satisfy the cover.

The verification tool 150 outputs the result 130 of the verification process, which may be stored in memory, passed along to another software process, or displayed to the user. The result may comprise a counter-example if the circuit design 120 fails to meet the properties encoded in the verification specification or a witness if the design 120 satisfies the properties (e.g., the witness can be a cover trace). A debugging tool 110 may also be included to display the counter-example or witness to a circuit designer in a useful way to the designer. This can facilitate understanding of what aspect of the HDL code in the circuit design 120 is responsible for the counter-example to the property in question. The debugging tool 110 may include a viewer as well as editing software.

After application of the soft constraints, the debugging tool 110 displays a waveform of the updated counter-example trace to a user of the debugging tool 110. In some embodiments, rather than displaying just the updated counter-example trace, the updated counter-example trace is displayed simultaneously with the original counter-example trace. This helps the circuit designer to understand of how the trace has changed as a result of applying the soft constraints. For example, a waveform for the updated counter-example may be displayed side-by-side with or overlaid on top of a waveform for the original counter-example. In another embodiment, a waveform of the updated counter-example is displayed along with markings on the waveform at specific signal-cycle pairs to indicate how the counter-example has changed as a result of applying the soft constraints.

In some embodiments, the debugging tool 110 displays a waveform for a partially updated trace before the debugging tool 110 finishes applying the soft constraints. Applying soft constraints can take a lengthy amount of time to complete, depending on the size and complexity of the circuit design, assumptions, properties, and soft-constraints. To increase the usability of the debugging tool 110 in these situations, the debugging tool 110 may display a waveform of a partially updated counter-example while the trace that best satisfies the soft constraints is being identified by the debugging tool 110. The partially updated counter-example may be displayed automatically according to a pre-defined configuration (e.g., whenever results are available) or in response to a user input requesting that it be displayed.

In some embodiments, after the updated trace is displayed, the debugging tool 110 allows the user to apply new soft or hard constraints to the updated counter-example trace, thereby generating a sequence of counter-example traces. To maintain similarity with the current trace, the current trace may be used as a soft constraint in determining the next trace. This creates a preference for similarity with the current trace, subject to the condition that the property is still violated. The debugging tool 110 thus attempts to make the next trace as similar as possible to current trace when applying the new constraint. For example, if the new constraint is a hard constraint, the resulting waveform highlights the forced changes caused by the hard constraint while reducing unnecessary changes to other signal-cycle pairs. As another example, if the new constraint is a soft constraint, the new constraint can be given a high priority while the soft constraint that prefers similarity with the current trace is given a lower priority.

The debugging tool 110 may also enable the user to jump between the traces in the sequence to compare differences between the traces. For example, the debugging tool 110 receives a user input selecting a trace for display. In response, the debugging tool 110 displays a waveform of the selected trace to the user. This enables the circuit designer to visualize how the trace changes on an incremental basis as new constraints are applied to the trace, which facilitates the process of debugging a circuit design.

Figure 2:
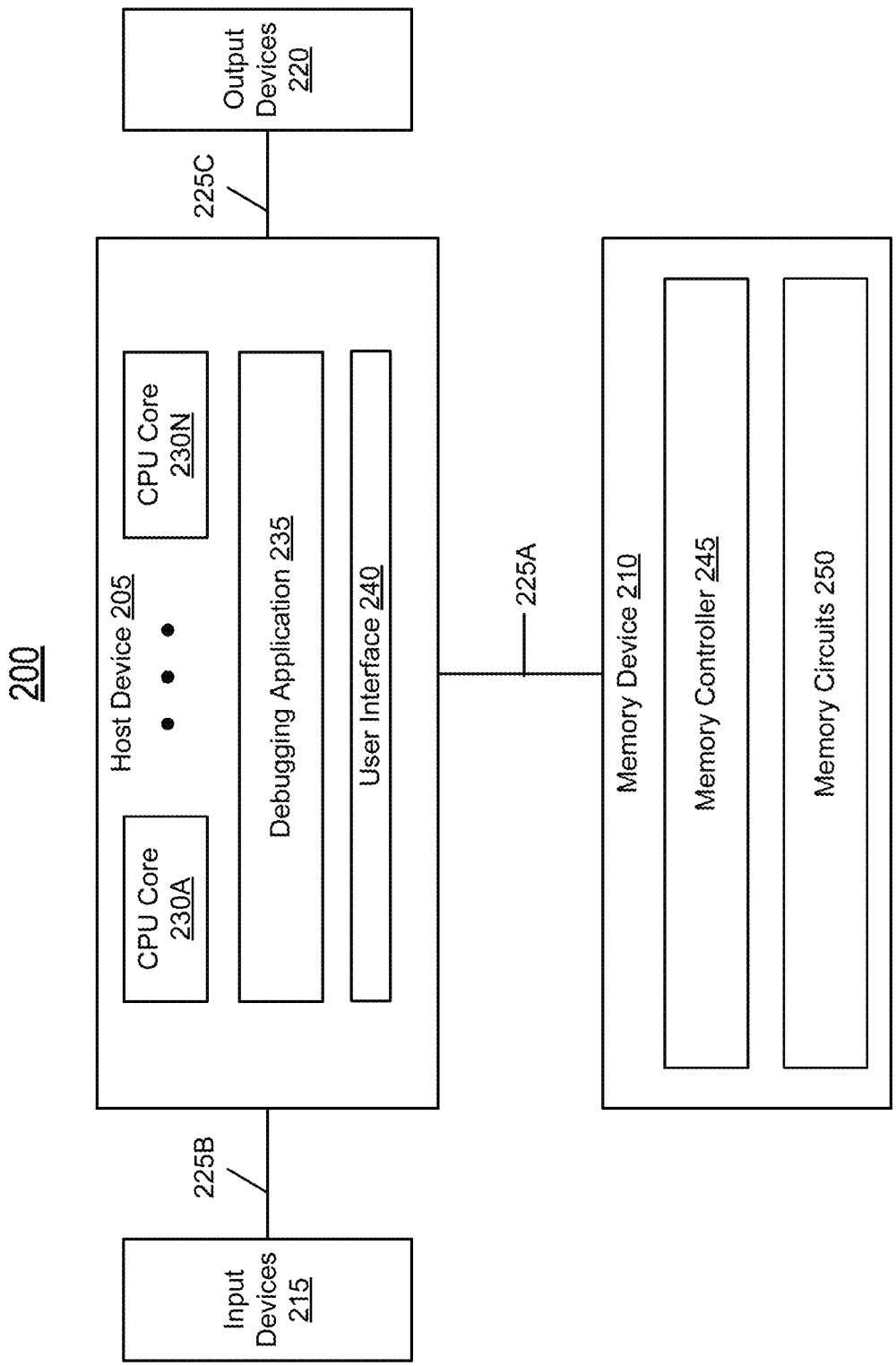
FIG. 2 illustrates an example block diagram of a debugging server, in accordance with some embodiments.

FIG. 2 illustrates an example block diagram of a debugging server 200, in accordance with some embodiments. The debugging server 200 is analogous to the debugging server described in FIG. 1 and can include a static formal verification tool (e.g., static formal verification tool 150) and a debugging tool (e.g., debugging tool 110). Furthermore, any reference to the debugging tool may include any of the applications described herein, or any combination thereof.

In some embodiments, the debugging server 200 includes a host device 205 associated with a memory device 210. The host device 205 may be configured to receive input from one or more input devices 215 and provide output to one or more output devices 220. The host device 205 may be configured to communicate with the memory device 210, the input devices 215, and the output devices 220 via appropriate interfaces or channels 225A, 225B, and 225C, respectively. The debugging server 200 may be implemented in a variety of computing devices such as servers, computers (e.g., desktop, laptop, etc.), tablets, personal digital assistants, mobile devices, wearable computing devices such as smart watches, other handheld or portable devices, or any other computing unit suitable for performing operations described herein using the host device 205. The host device 205 may be operated by a circuit designer or other user that is trying to debug issues in the circuit design.

Further, some or all of the features described in the present disclosure may be implemented on a client device, a server device, or a cloud/distributed computing environment (e.g., servers), or a combination thereof. For example, the features described herein may be implemented on an Internet of Things (IoT) platform and/or a cloud platform which may employ open application programming interfaces (e.g., APIs) to control other machines and/or devices that are connected through a network to the IoT platform and/or cloud platform. Additionally, unless otherwise indicated, functions described herein as being performed by a computing device may be implemented by multiple computing devices in a distributed environment, and vice versa.

The input devices 215 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 205 and that allows an external source, such as a user, to enter information (e.g., data) into the host device and send instructions to the host device 205. Similarly, the output devices 220 may include a variety of output technologies such as external memories, speakers, displays, microphones, light emitting diodes, headphones, plotters, speech generating devices, video devices, global positioning systems, and any other output peripherals that are configured to receive information (e.g., data) from the host device 205. The "data" that is either input into the host device 205 and/or output from the host device may include any of a variety of circuit design data, verification data, assertion data, debugging tool data, combinations thereof, or other types of analog and/or digital data that is suitable for processing using the debugging server 200.

The host device 205 may include one or more Central Processing Unit ("CPU") cores or processors 230A-230N that may be configured to execute instructions for running one or more applications associated with the host device 205. In some embodiments, the instructions and data needed to run the one or more applications may be stored within the memory device 210. The host device 205 may also be configured to store the results of running the one or more applications within the memory device 210. One such application on the host device 205 may include a debugging application 235. The debugging application 235 may implement a static formal verification tool algorithm (e.g., functions of the static formal verification tool 150) and/or a debugging tool algorithm (e.g., functions of the debugging tool 150). The debugging application 235 may be executed by one or more of the CPU cores 230A-230N. The instructions to execute the debugging application 235 may be stored within the memory device 210.

In some embodiments, the static formal verification tool algorithm and the debugging tool algorithm may be configured to execute functions related to formal verification and/or debugging issues as described herein. As explained above, debugging issues in circuit designs can be time-consuming, expensive, and very difficult to capture all issues during the debugging process. The debugging server 200 may solve this problem by running formal verification using mathematical algorithms or models and identifying counter-examples that help prove or disprove properties. In this way, the debugging server 200 is able to help reduce the time and cost of debugging issues.

Thus, the host device 205 may be configured to request the memory device 210 to perform a variety of operations. For example, the host device 205 may request the memory device 210 to read data, write data, update or delete data, and/or perform management or other operations. The host device 205 may also include a user interface 240 which may be may include any mechanism displaying information about the debugging server 200 and allowing an operator to interact with and/or provide data to the debugging server 200. In some embodiments, a user associated with a circuit design may utilize the user interface 240 to send instructions to CPU cores 230A-230N and/or the debugging application 235 using APIs.

In some embodiments, the user interface 240 may be accessed via an API (not shown). To access the user interface 240 via the API, a user may use designated devices such as laptops, desktops, tablets, mobile devices, other handheld or portable devices, and/or other types of computing devices that are configured to access the API. These devices may be different from the computing device on which the debugging server 200 is installed. In some embodiments and when the user interface 240 is configured for access via the API, the user may access the user interface via a web browser and upon entering a uniform resource locator ("URL") for the API such as the IP address of the debugging server 200 or other web address. Using the API and the user interface 240, the users may then send instructions to the debugging application 235 and receive information back from the debugging application 235. In some embodiments, the API may be a representational state transfer ("REST") type of API. In other embodiments, the API may be any other type of web or other type of API (e.g., ASP.NET) built using any of a variety of technologies, such as Java, .Net, etc., that is capable of accessing the user interface 240 and facilitating communication between the users and the debugging application 235. In some embodiments, the API may be configured to facilitate communication via a hypertext transfer protocol ("HTTP") or hypertext transfer protocol secure ("HTTPS") type request. The API may receive an HTTP/HTTPS request and send an HTTP/HTTPS response back. In other embodiments, the API may be configured to facilitate communication using other or additional types of communication protocols. In other embodiments, the debugging server 200 may be configured for access in other ways. The user interface 240, thus, facilitates human-computer interaction between the users and the debugging server 200. The user interface 240 may be configured as a graphical user interface ("GUI"), text-based user interfaces, or other man-machine interfaces.

To facilitate communication with the memory device 210, the memory device 210 may include or be associated with a memory controller 245. Although the memory controller 245 is shown as being part of the memory device 210, in some embodiments, the memory controller 245 may instead be part of the host device 205 or another element of the debugging server 200 and operatively associated with the memory device 210. The memory controller 245 may be configured as a logical block or circuitry that receives instructions from the host device 205 and performs operations in accordance with those instructions. For example, when the execution of the debugging application 235 is desired, the host device 205 may send a request to the memory controller 245. The memory controller 245 may read the instructions associated with the debugging application 235 that are stored within the memory device 210, and send those instructions back to the host device 205. In some embodiments, those instructions may be temporarily stored within a memory on the host device 205. One or more of the CPU cores 230A-230N may then execute those instructions by performing one or more operations called for by those instructions of the debugging application 235.

The memory device 210 may include one or more memory circuits 250 that store data and instructions for the circuit design, verification specification, verification results, and any other data that is input or generated by the debugging server 200. The memory circuits 250 may be any of a variety of memory types, including a variety of volatile memories, non-volatile memories, or a combination thereof. For example, in some embodiments, one or more of the memory circuits 250 or portions thereof may include NAND flash memory cores. In other embodiments, one or more of the memory circuits 250 or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory device 210. In some embodiments, one or more of the memory circuits 250 or portions thereof may be configured as other types of storage class memory ("SCM"). Generally speaking, the memory circuits 250 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the debugging server 200 are shown and described in FIG. 2. However, the debugging server 200 may include other components such as various batteries and power sources, networking interfaces, routers, switches, external memory systems, controllers, etc. Generally speaking, the debugging server 200 may include any of a variety of hardware, software, and/or firmware components that are needed or considered desirable in performing the functions described herein. Similarly, the host device 205, the input devices 215, the output devices 220, and the memory device 210, including the memory controller 245 and the memory circuits 250, may include hardware, software, and/or firmware components that are considered necessary or desirable in performing the functions described herein. In addition, in certain embodiments, the memory device 210 may integrate some or all of the components of the host device 205, including, for example, the CPU cores 230A-230N, and the CPU cores may be configured to execute debugging application 235, as described herein.

While the debugging server 200 has been illustrated in various figure(s) as a physical device, it is contemplated that it could exist instead as a virtual device operating on a virtual machine. While the debugging server 200 has been illustrated in various figures as a single device, it is contemplated that a debugging server performing the same (or substantially similar) functions as the debugging server 200 could be a virtualized device that is instantiated across one or more physical and/or virtual machines.

In formal verification, there are typically two types of properties: a safety property and a liveness property. Safety properties assert that something bad never happens during execution. And a liveness property asserts that something good eventually happens.

Figure 3:
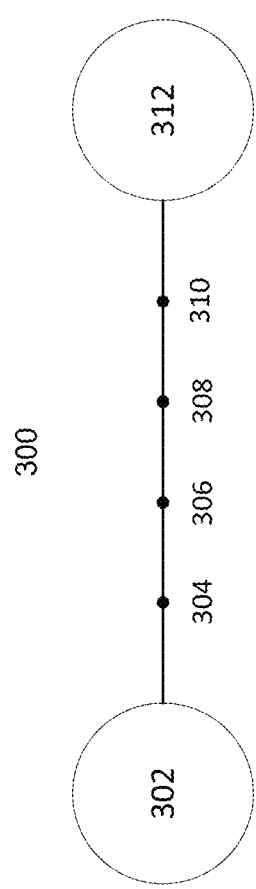
FIG. 3 illustrates an example of a counter-example trace for a safety property, in accordance with some embodiments.

FIG. 3 illustrates an example of a counter-example trace 300 for a safety property, in accordance with some embodiments. The counter-example trace 300 includes an initial state 302, intermediate states 304, 306, 308, and 310, and a bad state 312. The counter-example trace 300 is merely is an example, and the number of intermediate states may be different. The counter-example trace 300 includes a finite execution trace that starts from an initial state 302, traverses one or more intermediate states (e.g., states 304-310), and ends in the bad state 312. Because the bad state 312 was reached, the safety property is proven false.

Figure 4:
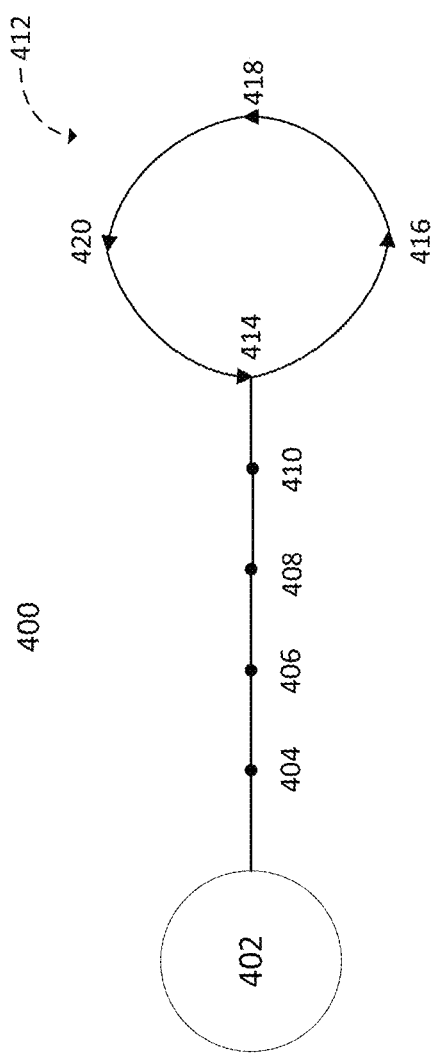
FIG. 4 illustrates an example of a counter-example trace for a liveness property, in accordance with some embodiments.

FIG. 4 illustrates an example of a counter-example trace 400 for a liveness property, in accordance with some embodiments. Liveness properties assert that something good eventually happens. The counter-example trace 400 can have the shape of a lasso and include an initial state 402, intermediate states 404, 406, a trigger 408, an intermediate state 410, and a loop 412, which includes bad states 414, 416, 418, and 420. The initial state 402, intermediate states 404, 406, trigger 408, and intermediate state 410 can collectively be called a stem of the counter-example trace 400. The counter-example trace 400 is merely is an example, and the number of intermediate states and the number of bad states may be different.

The counter-example trace 400 includes an infinite execution trace beginning with the initial state 402 and traversing the intermediate states 404 and 406. Then the system satisfies a condition of the trigger 408 which leads to a traversal of the intermediate state 410 and entry into the loop 412. The loop 412 can include the bad states 414, 416, 418, and 420 which the system continuously traverses and does not exit. The counter-example trace 400 proves that the liveness property false because the system stays within the loop 412.

Liveness properties is more challenging for model checking engines. An engine does more work on a liveness property, as it operates at three levels. First, the engine can choose the length of the trace. For instance, a trace of length 20 can be chosen S1, S2, . . . . S20. Second, the engine can choose where to close a loop. For instance, the engine can choose S17, S18, S19, S20, to be the loop such that the loop has a length of 4. Third, the engine checks the stem S1 to S16 and the loop S17 to S20.

Complexity wise, the choice of the loop is the most difficult part. The design to verify may have slow clocks and cyclic structures like counters, finite state machines (FSMs) and first-in-first-out memories (FIFOs). Such design features can restrict the type and the length of loops that can close. Not all loop lengths are feasible, and some loop lengths are easier to close than others.

In some embodiments, a proof configuration that restricts the loop length to a fixed value N can be implemented. From the original property P (e.g., liveness property), a derived property $P_N$ can be synthesized such that $P_N$ has a counter-example if P has a counter-example with loop length N.

A verification result of checking property $P_N$ can be interpreted under a bounded loop semantics: First, if $P_N$ fails, then P fails too. The counter-example found for $P_N$ is also a counter-example for P. Second, If $P_N$ is valid, then P is still undetermined. P has no counter-examples with loop length N, but it may still have counter-examples with different loop lengths. The disclosed technology can provide advantages of finding bugs in designs. It can accelerate the discovery of a counter-example for P.

When N is chosen, a counter-example for $P_N$ can be found in reasonable time. In conventional systems, a counter-example for P may never be found, although one may exist. Furthermore, choosing an N can help users understand debug their designs faster and easier, since users prefer a finite loop length. While the disclosed embodiments do not prove a liveness property in a conventional sense, there is a high probability that the liveness property is proven when the counter-example is not found. The embodiments of the present disclosure is helpful in finding bugs because counter-examples can be found within a limited number of loop lengths.

In some embodiments, the user may set the N to be within an interval of $[N_{min}, N_{max}]$. For example, a minimum loop length $N_{min}$ can be 5 and a maximum loop length $N_{max}$ can be 10. The user can then determine whether or not the loop length is long enough to sufficiently prove or disprove the liveness property.

In some embodiments, a bug-hunting strategy can be input so that a plurality of loop lengths of N can be checked. For example, if the maximum loop length $N_{max}$ is set to 25, a verification task for each loop length value in 1, 2, . . . 25. The system then may be execute a program to determine whether a counter-example can be found within the loop length of 1 to 25.

The verification algorithm can be executed to be performed from a minimum of a range to a maximum of the range. In one embodiment, for a range of 1 to 10, the verification algorithm can run length 1 on thread 1, . . . , and length 10 on thread 10. The threads can be run in parallel, where each thread checks a single length. In another embodiment, for a range of 1 to 10, the lengths of 1 to 10 are checked simultaneously using a single thread.

In some embodiments, the system may check a subset of all the traces with loop lengths within a loop length range. For example, for all loop lengths from 10 to 40, the system may check in increments of 5:10, 15, 20, 25, 30, 35, and 40. As another example, the system may randomly check 4 loop lengths between 10 and 40, for example, 13, 19, 23, and 38. As another example, the user may specify which loop lengths to check: 12, 18, 22, and 30.

In some embodiments, a loop length swarm strategy may be implemented. For example, a user can swarm on trace length rather than loop length. The user can specify the loop lengths to check the property.

FIG. 5 illustrates an example command line input 500 for executing the loop length swarm strategy, in accordance with some embodiments. For example, one or more configuration settings may be set to execute the loop length swarm strategy of finding a bug in the design. For example, a "mode" may refer to executing the loop length swarm strategy. As another example, "loop_length" may refer to whether the user specifies a list of loop lengths ("list") or a distribution of loop lengths such as a regular interval of loop lengths as discussed above ("distribution"). As another example configuration setting, the user may specify the size of the increment "loop_length_incr" (e.g., N=5). which informs the system the interval size of which loop lengths to choose for checking (e.g., N of 5 may inform the system to choose loop lengths that are 5 apart from one another). The range can be partitioned into intervals as specified by an interval length. The verification model can be performed on every interval by simultaneously checking all lengths in the interval.

Figure 6:
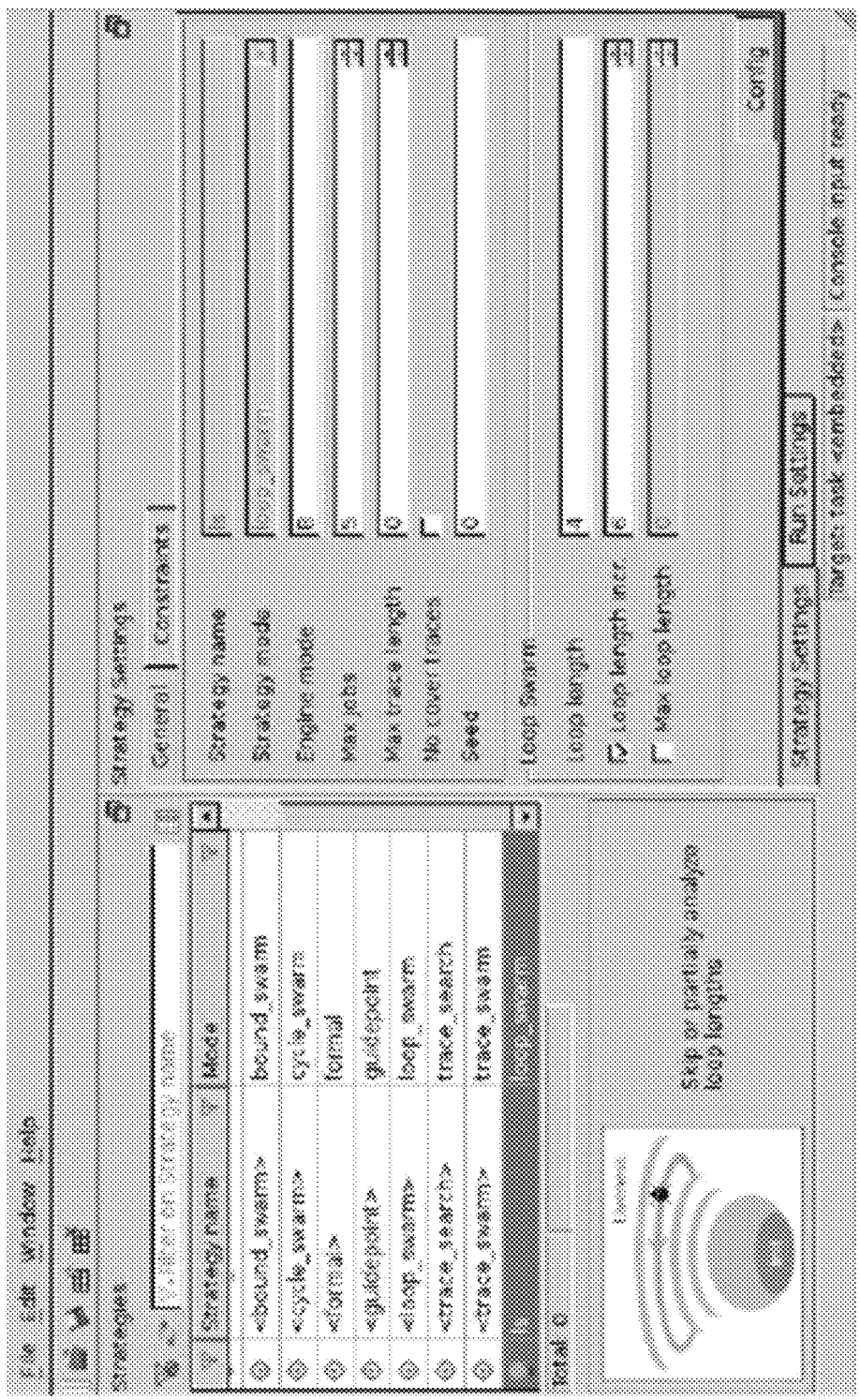
FIG. 6 illustrates an example graphical user interface input for executing the loop length swarm strategy, in accordance with some embodiments.

FIG. 6 illustrates an example graphical user interface input 600 for executing the loop length swarm strategy, in accordance with some embodiments. Similar settings as described with respect to FIG. 5 may be provided in the graphical user interface input 600.

Figure 7:
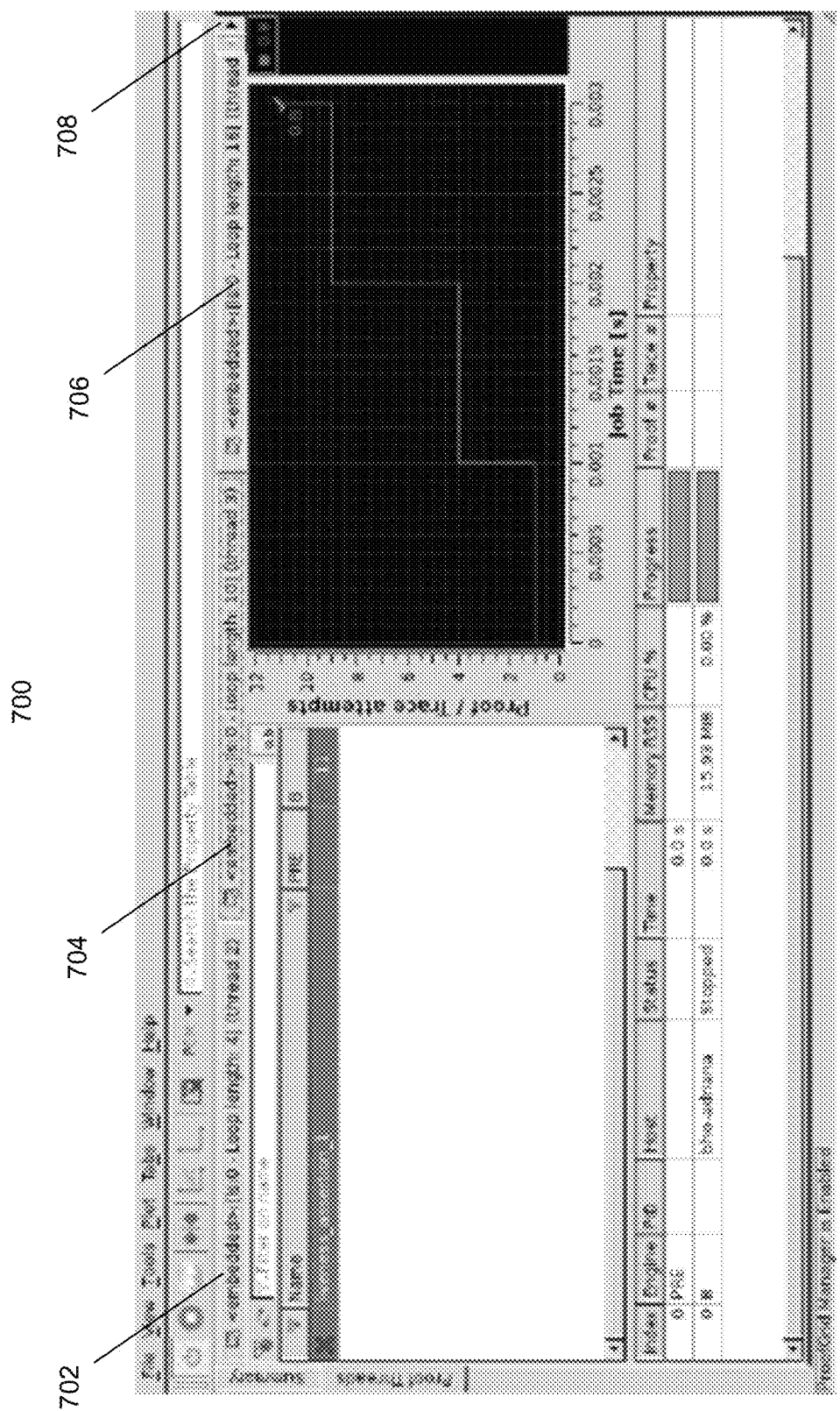
FIG. 7 illustrates an example proof grid manager of executing multiple proof threads, in accordance with some embodiments.

FIG. 7 illustrates an example proof grid manager 700 of executing multiple proof threads, in accordance with some embodiments. In some embodiments, verification tasks checking different loop lengths can run in parallel in different proof threads. Synchronization may be performed to stop all threads as soon as one thread finds a counter-example. The proof grid manager 700 can include multiple tabs that show the multiple proof threads, with each proof thread running a different proof check. For example, results of a first proof thread may be displayed in a first tab 702, results of a second proof thread may be displayed in a second tab 704, and results of a third proof thread may be displayed in a third tab 706. Results of additional proof threads may be displayed in tabs that may be shown by pressing the arrow 708.

In some embodiments, when there are not enough compute to run all the loop lengths, a time limit may be set per loop length or a max length limit on the entire set of loop lengths may be set for the entire trace (stem and loop). In the latter case, both the stem and the loop lengths for the trace can be controlled.

In some embodiments, at least two different proof checking engines may be run. For example, for a given loop length N, no counter-example for P may be shown. How long a loop length can be in order to show a counter-example may be difficult to predict. Accordingly, the two engines may be run. A first engine may include a proof-oriented engine that tries to prove that P has no counter-examples with loop length N. A second engine may include a trace-oriented engine that tries to find a counter-example for P with loop length N.

Figure 8:
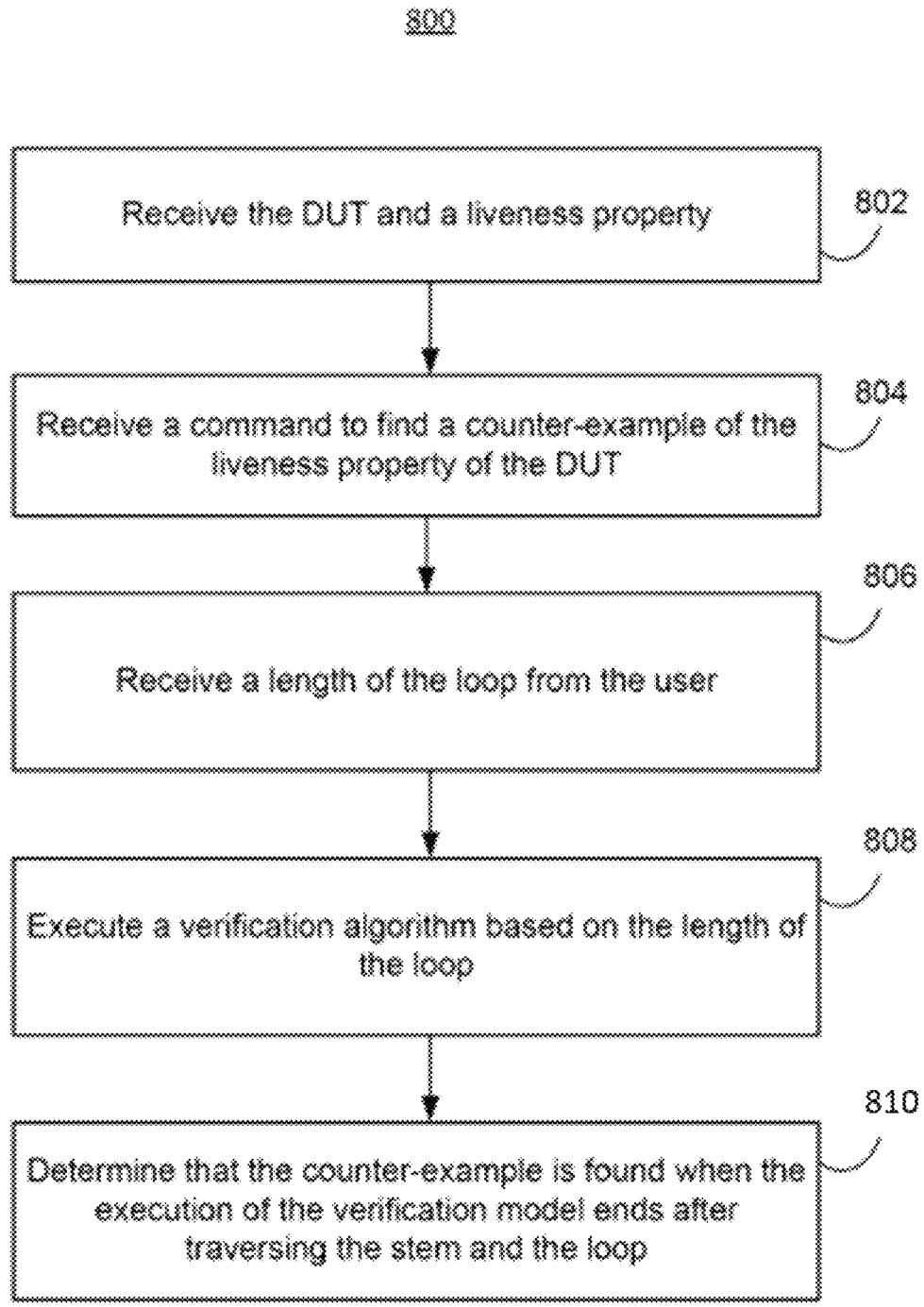
FIG. 8 illustrates flow chart of a method of debugging a DUT using formal verification, in accordance with some embodiments.

FIG. 8 illustrates flow chart of a method 800 of debugging a DUT using formal verification, in accordance with some embodiments. For example, the debugging server 200 can perform method 800, but embodiments are not limited thereto. It is to be understood that present implementations are not limited to the particular examples disclosed herein.

Step 802 includes receiving the DUT from a user. The DUT may include a design for a semiconductor chip that the user is trying to implement.

Step 804 includes receiving a command to find a counter-example of a liveness property of the DUT, wherein the counter-example includes a verification trace including a sequence of states structures as a stem followed by a loop. The command may be received via a command line with options selected or a GUI that includes dropdowns. As discussed above, a liveness property is an assertion stating that something good will eventually happen. A counter-example of the assertion disproves the liveness property. The counter-example of a liveness property runs in an infinite loop of bad states.

Step 806 includes receiving, by the one or more processors, a length of the loop from the user. The user may provide the length of the loop based on the user's knowledge of the design. Depending on embodiments, the user may also set one or more configuration settings. For example, instead of providing just one loop length, the user may provide a range of loop lengths (e.g., 10 to 40). The user may specify that each of the loop lengths are to be verified (e.g., every loop length from 10 to 40), every loop length of a certain interval is to be verified (e.g., every loop length of 5 apart, meaning 10, 15, . . . 35, 40), and/or a random set of loop lengths within the range (e.g., 13, 29, 30, 39).

Step 808 includes executing, by the one or more processors, a verification algorithm based on the length of the loop, wherein the formal verification tool can use a symbolic trace that encodes a large number of concrete traces. It can build a query on this trace and send the query to a solver. If satisfiable, the solver can produce a concrete trace that satisfies the query.

Depending on embodiments, the system may execute a plurality of threads that perform the execution of the verification algorithm, with each thread running the algorithm with one loop length. When a thread finishes the execution of a certain loop length, the thread may perform the execution of another loop length that has not been checked yet. For example, the system may receive a command to execute a verification algorithm with every loop length in the range of 10 to 40. The system may then spin four threads that execute the verification algorithm with loop lengths 10 to 13. If the thread with the loop length 12 finishes first without finding a counter-example, the thread may then proceed to perform the execution with the loop length 14. This process may be proceed until either (1) a counter-example is found in one of the threads at which point the execution will stop because the liveness property has been disproven or (2) no counter-example is found, which means that the design has a high probability that the liveness property has been proven.

Step 810 includes determining, by the one or more processors, that the counter-example is found when the execution of the verification algorithm ends after traversing the stem and the loop.

Accordingly, the user is able to quickly and efficiently determine whether a bug exists within the design.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method for debugging a design under test (DUT) using formal verification, the method comprising:
    receiving, by one or more processors, the DUT and a liveness property from a user;
    receiving, by the one or more processors, a command to find a counter-example of the liveness property of the DUT and a verification trace including a sequence of states structures as a stem followed by a loop;
    receiving, by the one or more processors, a length of the loop from the user;
    executing, by the one or more processors, a verification algorithm based on the length of the loop; and
    determining, by the one or more processors, that the counter-example is found when the execution of the verification algorithm ends after traversing the stem and the loop.

2. The method of claim 1, further comprising:
    receiving, by the one or more processors, a time limit of how long to execute the verification algorithm; and
    stopping, by the one or more processors, the execution of the verification algorithm when a duration of the execution reaches the time limit.

3. The method of claim 1, further comprising receiving, by the one or more processors, a range of the length of the loop, wherein the execution of the verification algorithm is simultaneously performed for each length from a minimum of the range to a maximum of the range.

4. The method of claim 3, wherein the execution of the verification algorithm is performed for every length of the loop within the range.

5. The method of claim 3, further comprising partitioning, by the one or more processors, the range into intervals specified by an interval length.

6. The method of claim 3, further comprising receiving, by the one or more processors, an input to select random lengths of the loop within the range.

7. The method of claim 1, wherein the execution of the verification algorithm is performed for a plurality of lengths of the loop using a plurality of threads, wherein each thread of the plurality of threads is configured to perform the execution of the verification algorithm of one of the plurality of lengths of the loop, and wherein the method further comprises stopping, by the one or more processors, the execution of the verification algorithm for all of the plurality of lengths of the loop when the counter-example is found in any of the plurality of lengths of the loop.

8. The method of claim 7, further comprising displaying, by the one or more processors, results of the plurality of threads executing the verification algorithm in a plurality of tabs.

9. The method of claim 1, wherein a first engine of the one or more processors determines that the counter-example is found and a second engine of the one or more processors determines there are no counter-examples having the length of the loop.

10. A system for debugging a design under test (DUT) using formal verification, the system comprising:
    one or more processors having instructions stored thereon that, when executed by the one or more processors, causes the one or more processors to:
        receive the DUT and a liveness property from a user;
        receive a command to find a counter-example of the liveness property of the DUT and a verification trace including a sequence of states structures as a stem followed by a loop;
        receive a length of the loop from the user;
        execute a verification algorithm based on the length of the loop and
        determine that the counter-example is found when the execution of the verification algorithm ends after traversing the stem and the loop.

11. The system of claim 10, wherein the instructions further cause the one or more processors to receive a time limit of how long to execute the verification algorithm and stop the execution of the verification algorithm when a duration of the execution reaches the time limit.

12. The system of claim 11, wherein the execution of the verification algorithm is performed for every length of the loop within the range.

13. The system of claim 11, wherein the instructions further cause the one or more processors to partition the range into intervals specified by an interval length.

14. The system of claim 11, wherein the instructions further cause the one or more processors to receive an input to select random lengths of the loop within the range.

15. The system of claim 10, wherein the execution of the verification algorithm is performed for a plurality of lengths of the loop using a plurality of threads, wherein each thread of the plurality of threads is configured to perform the execution of the verification algorithm of one of the plurality of lengths of the loop, and wherein the instructions further cause the one or more processors to stop the execution of the verification algorithm for all of the plurality of lengths of the loop when the counter-example is found in any of the plurality of lengths of the loop.

16. The system of claim 15, wherein the instructions further cause the one or more processors to display results of the plurality of threads executing the verification algorithm in a plurality of tabs.

17. A non-transitory computer readable medium including one or more instructions stored thereon and executable by one or more processors to:
    receive a command to find a counter-example of a liveness property of a design under test (DUT) and a verification trace including a sequence of states structures as a stem followed by a loop;
    receive a range of lengths of the loop from the user;
    execute a verification algorithm based on the length of the loop; and
    determine that the counter-example is found when the execution of the verification algorithm ends after traversing the stem and the loop.

18. The non-transitory computer readable medium of claim 17, wherein the execution of the verification algorithm is simultaneously performed for each length from a minimum of the range to a maximum of the range.

19. The non-transitory computer readable medium of claim 18, wherein the execution of the verification algorithm is performed for every length of the loop within the range.

20. The non-transitory computer readable medium of claim 18, wherein the instructions further cause the one or more processors to partition the range into intervals specified by an interval length.

* * * * *